United States Patent [19]

Blackborow

[11] Patent Number: 5,559,191
[45] Date of Patent: Sep. 24, 1996

[54] FUNCTIONALISED HYDROCARBYL POLYMERS

[75] Inventor: John R. Blackborow, Edinburgh, Scotland

[73] Assignee: BP Chemicals Limited, London, England

[21] Appl. No.: 520,955

[22] Filed: Aug. 30, 1995

[30] Foreign Application Priority Data

Aug. 30, 1994 [GB] Scotland ................... 9417422
Aug. 30, 1994 [GB] Scotland ................... 9417424

[51] Int. Cl.$^6$ .............. C08F 255/02; C08F 255/10; C08F 210/16; C08F 210/10
[52] U.S. Cl. .............. 525/275; 525/328.1; 526/285
[58] Field of Search ............... 525/275, 328.1; 526/285

[56] References Cited

U.S. PATENT DOCUMENTS

| | | | |
|---|---|---|---|
| 2,221,662 | 11/1940 | Rothrock | 260/78 |
| 3,562,218 | 2/1971 | D'Alello | 260/67 |
| 4,234,435 | 11/1980 | Meinhardt et al. | 252/51.5 A |
| 4,417,038 | 11/1983 | Vogel | 526/285 |
| 4,794,130 | 12/1988 | Hayakawa | 522/33 |
| 5,112,507 | 5/1992 | Harrison | 252/51.5 A |
| 5,122,572 | 6/1992 | Kennedy et al. | 525/314 |

FOREIGN PATENT DOCUMENTS

| | | |
|---|---|---|
| 61026601 | 1/1986 | Japan. |
| 1344847 | 1/1974 | United Kingdom. |
| 9003359 | 4/1990 | WIPO. |
| 9012851 | 11/1990 | WIPO. |

*Primary Examiner*—Vasu S. Jagannathan
*Attorney, Agent, or Firm*—Brooks, Haidt, Haffner & Delahunty

[57] ABSTRACT

This invention relates to a process for functionalising synthetic hydrocarbyl polymers having at least one olefinic group by (i) reacting at elevated temperature the synthetic hydrocarbyl polymer with an alkyne compound substituted with at least one electron withdrawing —C(O)R or a —CN group so that the olefinic group in the polymer reacts with the alkyne group of the alkyne compound to form an intermediate and (ii) reacting the intermediate from step (i) above with a nucleophile to form a functionalised hydrocarbyl polymer. The functionalised polymers are useful as additives for lubricating oils and fuels.

11 Claims, No Drawings

The resultant intermediate, after removal of the excess alkyne compound, can be used directly in further reactions with or without further purification, filtration and/or washing.

These, further reactions include reactions with compounds having nucleophilic groups (hereafter "nucleophiles") which include inter alia amines, alcohols and thiols, and the so called "Michael nucleophiles" such as e.g. nitroalkanes, dicarboxylates [$CH_2(CO_2R^*)_2$] and dicarbonyls [$CH_2(CO.R^*)_2$] where in each of these compounds R* is a hydrocarbyl group, and dinitriles $CH_2(CN)_2$]. These so called Michael nucleophiles are those which are capable of undergoing the Michael reaction and are discussed in detail in "Organic Chemistry" by Hendrickson, Cram and Hammond, published by McGraw-Hill Kogkusha Ltd (3rd Edn), Tokyo (1970), pp 480 and 481. Specific examples of nucleophiles which may be used for reaction with the alkylating agents of this invention include:

The thiols: e.g. HS.R㊈ $Si(OR')_{n'}(R'')_{3-n}$

HS.R㊈ .$NH_3^+X^-$

HS.$C_nF_{n+2}$

HS.$(C_nH_{2n})C_mF_{2m+1}$ 2,5-Dimercapto-1,3,4-thia-diazole (in which R㊈ represents a hydrocarbylene group and each of R' and R" represents a hydrocarbyl group)

The Amines: e.g. Dimethylaminopropylamine

Ethylenediamine

Polyamines

Polyolamines

Alkoxyamines

The Alcohols: e.g. Monohydric alcohols

Polyols

Alkoxypolyols

The mole ratio of the alkylating agent to the nucleophile in such a reaction is suitably from 1:5 to 5:1, preferably 1:1, optionally in the presence of a solvent which is inert to both the reactants and the products under the reaction conditions.

In order to carry out the reaction of step (ii), it may be necessary in some cases to use a catalyst, which may be acidic or basic, in order to enhance the rate of reaction. The step (ii) reaction is suitably carried out in an atmosphere inert under the reaction conditions e.g. nitrogen and at a temperature from 0° to 200° C. The reaction pressures may vary from atmospheric to 1015 KPa, preferably from atmospheric to 510 KPa.

The reaction is suitably carried out for a period of 30 seconds to 10 hours. Thus some of the reactions that occur can be represented structurally as follows:

$$\ldots C(R^3)=CH_2 + R^1.C\equiv C.R^2 \longrightarrow$$
(I) \quad\quad (II)

$$\ldots CH=C(R^3).CH_2.C(R^2)=CH.R^1 \quad (III)$$

$$\downarrow \text{nucleophile (H-NUC)}$$

$$\ldots CH=C(R^3).CH_2.CH(R^2).CH(R^1).NUC \quad (IV)$$
and/or
$$\ldots CH=C(R^3)CH_2.C(CO.NUC)=CH.R^1 \quad (IVa)$$
or
$$\ldots CH=C(R^3)CH_2.C(R^2)=CH(CO.NUC) \quad (V)$$

wherein $R^3$ is an alkyl group $R^1$ and $R^2$ each represent the same or different substituents on the alkyne compound of which at least one is an electron-withdrawing group H-NUC is the nucleophile having a single nucleophilic site. Compounds of the structures (IVa) and (V) may be formed predominantly if the reactant alkyne compound (II) is an alkyne carboxylate.

In a further embodiment, the present invention is a process for producing functionalised high molecular weight hydrocarbyl polymers which have a plurality of hydrocarbyl chains and groups derived from nucleophiles, said process comprising subjecting an intermediate formed from an alkyne compound having more than one electron withdrawing group to reaction with a nucleophile having more than one nucleophilic site at elevated temperature.

This reaction to produce a functionalised high molecular weight hydrocarbyl polymer is suitably carried out for a period of 30 seconds to 10 hours. The nature of the reaction product from the polymerisation step can be represented by several structures depending upon the nature of the specific reactants used and the point at which the addition occurs. Thus the reaction product can contain a polymer represented by the structures (VI) and/or (VII) below:

$$\ldots C(R^3)=CH_2 + R^1.C\equiv C.R^2 \longrightarrow \ldots CH=C(R^3).CH_2.C(R^2)=CH.R^1$$
(I) \quad\quad (II) \quad\quad\quad\quad\quad\quad (III)

$$\downarrow \text{nucleophile (H-NUC-H)}$$

$$\ldots CH=C(R^3).CH_2.CH(R^2).CH(R^1).NUC-H \quad (IV)$$

$$\ldots CH=C(R^3).CH_2 \ldots CH=C(R^3).CH_2 \quad +\atop\longleftarrow \Delta H$$
$$\quad\quad | \quad\quad\quad\quad\quad\quad\quad | $$
$$H.[nuc.CH(R^1).CH.R^{2'}]_n.nuc.CH(R^1).CH.R^2$$

(VI)

wherein $R^3$ is an alkyl group $R^1$ and $R^2$ each represent the same or different substituents on the alkyne compound of which at least one is an electron-withdrawing group $R^{2'}$ is the divalent radical derived from the group R2 (e.g. —CO— when $R^2$ is —C(O)R)

H-NUC-H is a nucleophile having two or more nucleophilic sites nuc is the divalent radical from H-NUC-H n is an integer from 2 to 1000, preferably from 2–200;

or, when $R^1$ and $R^2$ are —CO.$OR^4$ in which $R^4$ is an alkyl group

FUNCTIONALISED HYDROCARBYL POLYMERS

This invention relates to a process for the manufacture of functionalised hydrocarbyl polymers and the use thereof to produce additive for fuels and lubricants.

The functionalisation of hydrocarbon polymers often requires relatively extreme reaction conditions, or the use of environmentally undesirable chemicals such as chlorine. One well established method of functionalising hydrocarbon polymers is the reaction of such polymers, especially polyolefins with an enophile. The reaction of polybutene with maleic anhydride is a specific example. Unless this maleinisation reaction is carefully controlled, e.g. by suitable choice of highly reactive polymers or controlling the reaction conditions, there is a risk of formation of deleterious resins and tars as by-products. Moreover, where chlorine is used to enhance the reactivity of the polyolefin towards maleic anhydride, this must also be removed along with some insoluble resins Which invariably accompany such a reaction before reacting the resultant succinate with e.g. a polyamine to form the corresponding imide. This, however, does not detract from the fact that there is a need for functionalised hydrocarbyl polymers, especially for use in many commercial applications such as e.g. surfactants, agrochemicals, antioxidants, UV stabilizers and as additives for fuels and lubricants. Most of such end uses need the presence of a polar group such as amines, phenols, esters, sulphonamides and the like. In the case of their use as additives for fuels and lubricating oils, they usually function as dispersants and detergents in internal combustion engines. Such additives are often made from synthetic hydrocarbon polymers functionalised with polar groups such as imido amines, amines, esters, hydroxyamaines, esters and the like. The synthetic hydrocarbon polymers used are often poly(iso)butenes, liquid polypropylenes or oligomers of other 1-olefins. The functionalised polymers so produced are usually oil soluble.

It is also possible to produce higher molecular weight functionalised hydrocarbyl polymers which have a good degree of both viscosity index improving and dispersancy properties in oil solutions. Such polymers can be produced by a variety of methods such as e.g. (a) using a high molecular weight starting polymer, (b) oligomerizing a functionalised hydrocarbon polymer (c) joining together several hydrocarbon and polar substituents in a chain or matrix and (d) degrading very high molecular weight functionalised copolymers of ethylene of propylene by oxidation or mechanical shearing. One such method is described in U.S. Pat. No. 4,234,435 in which a substituted acylating agent is first made from a halogenated polymer and maleic anhydride and which contains on an average at least 1.3 acylating groups per polymer chain; such chains when reacted with polyamines can be joined together by the polyamines to form imido-amine functionalised high molecular weight chains or matrices. When such high molecular weight polymers are used as an oil additive, they have dispersant properties and also significantly enhance the viscosity index of such oils.

It has now been found that an intermediate can be formed by reaction of an olefinic compound with an alkyne compound without the use of any halogen; and this intermediate can be reacted subsequently with a nucleophile to form a functionalised hydrocarbyl polymer without resorting to relatively extreme reaction conditions which are normally the cause of most of the problems outlined above. Moreover, such functionalised hydrocarbyl polymers can be converted to a relatively high molecular weight product by a relatively simple method.

Accordingly, the present invention is a process for functionalising synthetic hydrocarbyl polymers having at least one olefinic group, said process comprising:

i. reacting at elevated temperature the synthetic hydrocarbyl polymer with. an alkyne compound substituted with at least one electron withdrawing—C(O)R or —CN group so that the olefinic group in the polymer reacts with the alkyne group of the alkyne compound to form an intermediate and ii. reacting the intermediate from step (i) above with a compound having nucleophilic groups to form a functionalised hydrocarbyl polymer.

The hydrocarbyl polymer is suitably a polymer of an olefinic monomer selected from ethylene, propylene, butylene, isobutylene, 4-methyl pent-1-ene and styrene. These monomers may in turn be polymerised to the corresponding polymer by using well known methods of cationic polymerisation described in the art. A specific example of such a method is described in our published EP-A-O 145235. The polymers that may be used therefore are suitably polyethylene, polypropylene, poly(iso)butylene and polystyrene. The polymers suitably have a molecular weight in the range from 350 to 10,000, preferably from 700 to 5,000. Of these liquid polypropylene and poly(iso)butenes ire preferred and of these the poly(iso)butenes may be of the HYVIS®, NAPVIS®, ULTRAVIS® grades (all ex BP Chemicals LId) or the GLISSOPAL® grade (ex BASF) and especially those having a high proportion of terminal vinylidene groups as described in our published EP-A-145235.

The alkyne compound carrying electron withdrawing groups as substituent is suitably a monomer such as a derivative of monoemeric acetylene. Examples of such compounds include acetylene dicarboxylate, alkyl propiolates and the like. In the electron withdrawing —C(O)R group of the alkyne compound, R is suitably an —OH, —O-alkyl or an —O-aryl group in which the alkyl and aryl groups have from 1–12 carbon atoms. Thus the —C(O)R group may comprise at least one of the compounds selected from the group consisting of carboxylic acids and carboxylate esters. Specific examples of alkyne compounds substituted by one or more electron withdrawing groups include inter alia methyl propiolate, propiolic acid, acetylene dicarboxylic acid, acetylene dimethyl dicarboxylate.

The reaction between the hydrocarbyl polymer having at least one olefinic group and the alkyne compound substituted with electron withdrawing groups is suitably carried out using a molar ratio of the hydrocarbyl polymer to alkyne compound in the range from 1:1 to 1:10, preferably from 1:1 to 1:3. The reaction of step (i) is suitably carried out by heating a mixture of the two compounds, optionally in a solvent which is inert to the reactants and products under the reaction conditions, to an elevated temperature, suitably in the range from 50°–200° C., preferably from 100°–200° C. The reaction is suitably carried out in an atmosphere inert under the reaction conditions e.g. nitrogen.

The reaction may optionally be carded out in the presence of a catalyst, suitably an acid catalyst, preferably a Lewis acid such as e.g. an (alkyl)aluminium halide, especially aluminum trichloride.

The reaction pressure used may suitably vary between atmospheric and 1015 KPa, preferably from atmospheric to 510 KPa.

The reaction is suitably carried for a period from 30 minutes to 10 hours, preferably from 1 to 6 hours.

Any excess alkyne compound present in the reaction mixture can be removed therefrom by distillation under reduced pressure.

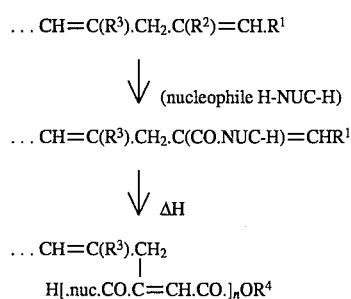

...CH=C(R³).CH₂.C(R²)=CH.R¹   (III)

↓ (nucleophile H-NUC-H)

...CH=C(R³).CH₂.C(CO.NUC-H)=CHR¹   (IVa)

↓ ΔH

...CH=C(R³).CH₂   (VII)
          |
          H[.nuc.CO.C=CH.CO.]ₙOR⁴

In the reactions represented above, structure (III) in which the dots ( ... ) represent the hydrocarbyl chain, is one of many isomeric structures possible by the reaction of compound (II) with compound (I), where (II reacts by forming a carbon-carbon bond between the vinylidene (—CH₂) group and (II). Similarly, structure (IV) is one of marry isomeric structures where H-NUC-H adds to tbe isomers of (III) at either carbon atom attached to R² and R¹. In the reaction product resulting from such a reaction, some isomers will inevitably predominate depending upon the exact chemical nature of (II) and H-NUC-H. Other polymer chains can be formed if (III) reacts with H-NUC-H by a substitution reaction rather than an addition reaction mechanism. These other chains can further reset with a further molecule of (III) or H-NUC-H by an addition or substitution reaction, Thus, due to the polyfunctional nature of the products resulting from the reaction of (III) with H-NUC-H, it is virtually impossible to specifically define the nature of the reaction products with a single structural formula.

As stated previously, the intermediate (IVa) or (V) can be predominantly formed if the alkyne compound is an alkyne carboxylate and this, when reacted with a nucleophile having more than one nucleophilic site, results in (VII). There is evidence of these structures in the form of loss of methanol and loss of ester band in the spectrum for the products derived by cross-linking or chain linking. Cross-linking occurs when there are multiple nucleophilic sites on the nucleophilc whereas chain-linking occurs when the nucleophilc has only two nucleophilic sites. Structure (VI results if the crosslinking chain-linking reaction occurs from addition and substitution reactions between a nucleophile having more than one nucleophilic site and (III).

The products of such reactions arc functionalised hydrocarbyl polymers containing polar groups and their higher molecular weight derivatives and are useful e.g. as additive for fuels such as gasoline and for lubricants.

The present invention is further illustrated with reference to the following Examples:

EXAMPLE 1

A. Preparation of the Intermediate

GLISSOPAL® (ex BASF), a poly(iso)butene (50 g, Mn=932), aluminum trichloride (300 mg) and dimethylacetylene dicarboxylate (15.24 g) were placed in a 300 ml autoclave. The autoclave was purged with nitrogen and sealed. The stirred autoclave and its contents were heated to 200° C. After 4 hrs the autoclave was cooled and and the contents thereof dissolved in heptane. The heptane solution was washed with a water/acetone mixture (60/40 v/v) and the organic fraction was filtered. This organic fraction was evaporated at 180° C. under vacuum to remove initially the solvent and then the excess unreacted acetylene dicarboxylate.

A clear deep orange intermediate (58.66 g) was obtained. The ¹³C NMR spectrum of this material showed the absence of acetylenic carbon atoms, the presence of at least two types of carbonyl groups and the absence of a major part of the olefinic ¹³C NMR spectrum of the polybutene. The viscosity of this intermediate was 292 mm²/s (292 cSt) at 100° C.

B. Reaction of a Nucleophile with the Intermediate

The intermediate (8 g) prepared in Example 1A above was dissolved in heptane (5 g) and xylene (2 g) in a 50 ml flask. To this flask was added dropwise dimethylaminopropylamine (0.9 g) over 3 minutes at room temperature; the contents of the flask immediately underwent a colour change from deep orange to maroon. The contents of this flask were then heated to 70° C. and then the solvent and excess amine were removed under vacuum at 100° C. A maroon liquid was left in the flask. The total nitrogen content of this liquid was 1.1% w/w. The viscosity of this liquid was 413 mm²/s (413 cSt) at 100° C.

EXAMPLE 2

Preparation of a Functionalised High Molecular Weight Hydrocarbyl Polymer)

The intermediate (38.36 g) prepared in Example 1A above was placed in a three-necked stirred glass flask and heated under nitrogen to 175° C. Triethylenetetramine (TETA, ® 5.3 ml) was added dropwise with stirring over 2.5 hrs. The flask was lightly sparged with nitrogen during addition of TETA. After completion of the reaction, the flask was allowed to cool and the contents thereof poured into a storage bottle. The viscosity of this product was >30,000 mm²/s (>30,000 cSt) at 100° C.

A comparison of the viscosities of the intermediate (Mn~1100) and TETA (Mn~146) with the final product is given in Table 1 below:

| Compound | Viscosity (mm²/s) at 100° C. |
|---|---|
| Intermediate from Example 1A | 292 |
| TETA | <10 |
| Final crude product | >30,000 |
| Final product after water washing/filtration | 17,600 |
| Nitrogen content of the final polymeric product was 3.3%. | |

EXAMPLE 3A

Preparation of the Intermediate

GLISSOPAL® (ex BASF), a poly(iso)butene (50.1 g, Mn=932), aluminium trichloride (0.35 g) and dimethylacetylene dicarboxylate (15.25 g) were placed in a 300 ml PARR autoclave. The autoclave was purged with nitrogen and sealed. The stirred autoclave and its contents were heated to 200° C. and held at this temperature for 4 hours. After 4 hrs the autoclave was cooled (pressure 172.4 KPa (25 psig)) and and the contents thereof dissolved in heptane. The heptane solution was washed with a water and the organic fraction separated and filtered through a 0.45 μm filter. This organic fraction was evaporated at 180° C. under full vacuum for 30 minutes to remove initially the solvent and then the excess unreacted acetylene dicarboxylate.

55.84 g of the intermediate was recovered (viscosity at 100° C., 305 mm$^2$/s (305 cSt)). A sample of this product was dissolved in diethyl ether and passed down an alumina column; the column was eluted with ether and the ether removed from the eluate. It was found that 65.6% of the product had been retained in the column.

The product was analysed and found to contain ester groups and a new olefin group (Infra-red absorbances at 1730 cm$^{-1}$ and 1640 cm$^{-1}$) and 70.8% of the vinylidene end groups present in the starting polybutene were found to have disappeared in the product. The elemental analysis of the product was C=80.4%; H=12.8%; and O=6.3%.

EXAMPLE 3B

Reaction of a Nucleophile With the Intermediate

The product (37.1 g) from Example 3A was stirred at 80° C. and triethylene tetramine (3.7 ml) was added to it dropwise over 30 minutes. A colour change from dark orange to maroon was observed and the temperature increased to 85° C. by the time addition was completed. After two hours at 80° C., a sample of the mixture was analysed for viscosity and found to have a viscosity of 430 mm$^2$/s (430 cSt) at 100° C. showing that the maroon material had little cross-linking (for a much higher viscosity would have been observed with cross-linking).

The maroon solution was then heated to 180° C. with stirring, and held at this temperature for two and a half hours. Methanol was found in the distillate. This product was cooled and dissolved in xylene and washed with a methanol/water mixture (50/50 v/v) to remove the unreacted amine. The organic fraction was separated and dried over anhydrous calcium chloride for 24 hours. This fraction was then filtered and the solvent and other volatiles removed from the filtrate by vacuum stripping at 180° C. 27.3g of a polymeric material was recovered which had a viscosity of 18675 mm$^2$/s (18675 cSt at 100° C.) at 100° C. The elemental analysis of the product was C=75.4%; H=12.2%; N=3.4%; and O=2.7%. In the infra-red spectrum of the product, the ester absorbance at 1730 cm$^{-1}$ had disappeared and a growth of new bands between 1705 and 1560 cm$^{-1}$ was observed.

EXAMPLE 4A

Preparation of the Intermediate

GLISSOPAL® (ex BASF), a poly(iso)butene (50.1 g, Mn=972), together with methyl propiolate (9.1 g) and aluminum trichloride (0.3 g) were placed in a PARR autoclave which was then purged with nitrogen and sealed. The stirred autoclave and its contents were heated to 200° C. and held at this temperature for 16.5 hours. Thereafter, the autoclave was cooled and and the contents thereof dissolved in heptane. Approximately, 2.5 volumes of heptane per volume of the product was used. The heptane solution was washed with a water and filtered. This filtrate was evaporated at 180° C. under vacuum to remove initially the solvent and then the excess unreacted methyl propiolate. 50.5 g of the product which had a viscosity of 247 mm$^2$/s (247 cSt) was recovered at 100° C. An alumina column retained 63.2% by weight of a sample when eluted with diethyl ether, confirming that a polar Functional group had to been attached to the polymer.

EXAMPLE 4B

Reaction of the Intermediate with a Nucleophile

The intermediate product (40.1 g) from Example 4A was heated to 80° C. in a stirred reactor and triethylene tetraamine (3.7 ml) was added dropwise to the reactor over 30 minutes. During the addition, the colour of the mixture became darker and the temperature rose to 83° C. After addition had finished the temperature rose to 90° C. where it was held for two hours. A sample was taken for viscosity analysis (210 mm$^2$/s (210 cSt) at 100° C.).

The reaction temperature was then raised to 180° C. and held there for three hours. The reaction product was cooled and dissolved in xylene and washed with water. The organic phase resulting therefrom was separated and dried over calcium chloride overnight. The xylene and other volatiles were stripped off at full vacuum for 30 minutes. The viscosity of the product was measured at 575 mm$^2$/s (575 cSt) at 100° C. The elemental analysis was: C=82.2 wt %; H=13.7wt %, N=1.7 wt % and O=0.9 wt %. 28.1 g of the product was recovered.

We claim:

1. A process for functionalising synthetic hydrocarbyl polymers having at least one olefinic group, said process comprising:

i. reacting at elevated temperature the synthetic hydrocarbyl polymer with an alkyne compound substituted with at least one electron withdrawing— C(O)R or a —CN group so that the olefinic group in the polymer reacts with the alkyne group of the alkyne compound to form an intermediate and ii. reacting the intermediate from step (i) above with a nucleophile to form a functionalised hydrocarbyl polymer.

2. A process according to claim 1 wherein the hydrocarbyl polymer is a polymer of an olefinic monomer selected from ethylene, propylene, butylene, isobutylene, 4-methyl pent-1-ene and styrene having a molecular weight in the range from 350 to 10,000.

3. A process according to claim 1 wherein the hydrocarbyl polymer is liquid polypropylene or poly(iso)butane.

4. A process according to claim 1 wherein the hydrocarbyl polymer is a high vinylidene polypropylene or high vinylidene poly(iso)butene.

5. A process according to claim 1 wherein R in the electron withdrawing group —C(O)R of the alkyne compound is a carboxylic acid or an alkyl carboxylate.

6. A process according to claim 5 wherein the alkyne compound substituted with an electron withdrawing groups is selected from the group consisting of an alkyl propiolate, acetylene dicarboxylic acid, acetylene dialkyl dicarboxylate and propiolic acid.

7. A process according to claim 6 wherein the alkyne compound is methyl propiolate or acetylene dimethyl dicarboxylate. propiolate or acetylene dimethyl dicarboxylate.

8. A process according to claim 1 wherein the intermediate from step (i) is reacted with a nucleophile selected from the group consisting of amines, alcohols and thiols.

9. A process according to claim 1 wherein the reaction in step (ii) is carried out in an atmosphere inert under the reaction conditions and at a temperature from 0° to 200° C.

10. A process according to claim 1 wherein said process produces functionalised high molecular weight hydrocarbyl polymers which have a plurality of hydrocarbyl chains and groups derived from nucleophiles by reacting at elevated temperature an intermediate formed from an alkyne compound having more than one electron withdrawing substituent with a nucleophile having more than one nucleophilic site.

11. An additive for fuel or lubricants said additive comprising at least one of the functionalised hydrocarbyl polymers resulting from a process according to claim 1.

* * * * *

UNITED STATES PATENT AND TRADEMARK OFFICE
CERTIFICATE OF CORRECTION

PATENT NO. : 5,559,191  
DATED : September 24, 1996  
INVENTOR(S) : JOHN R. BLACKBOROW Page 1 of 2

It is certified that error appears in the above-indentified patent and that said Letters Patent is hereby corrected as shown below:

Col. 2, l. 27, correct the spelling of "Ltd)"

Col. 3, l. 5, delete the comma (,) after the word "These"

Col. 3, l. 11, there should be a bracket ([) before "$CH_2$"

Col. 3, lines 56-57, "The step (ii)" should start a new paragraph

Col. 5, l. 16, "(II" should read --(II)--

Col. 5, l. 17, after "vinylidene" should read --(=$CH_2$)--

Col. 5, l. 18, correct the spelling of the word "many"

Col. 5, l. 19, correct the spelling of the word "the"

Col. 5, l. 39, correct the spelling of the word "nucleophile"

Col. 5, l. 40, correct the spelling of the word "nucleophile"

Col. 5, l. 42, should read "crosslinking/chain-linking"

Col. 6, lines 29-30, should read "(TETA, 5.3 ml)"

UNITED STATES PATENT AND TRADEMARK OFFICE
CERTIFICATE OF CORRECTION

PATENT NO. : 5,559,191
DATED : September 24, 1996
INVENTOR(S) : JOHN R. BLACKBOROW It is certified that error appears in the above-indentified patent and that said Letters Patent is hereby corrected as shown below:

Column 8,
    Claim 7, line 57, after the period (.) delete "propiolate or acetylene dimethyl dicarboxylate."

Signed and Sealed this

Twenty-fifth Day of February, 1997

Attest:

BRUCE LEHMAN

Attesting Officer     Commissioner of Patents and Trademarks